US012795741B2

(12) United States Patent
Gao et al.

(10) Patent No.: US 12,795,741 B2
(45) Date of Patent: Nov. 10, 2026

(54) SYSTEMS AND METHODS FOR ENHANCED RANDOM ACCESS PROCEDURE

(71) Applicant: ZTE CORPORATION, Shenzhen (CN)

(72) Inventors: Yuan Gao, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 270 days.

(21) Appl. No.: 18/640,366

(22) Filed: Apr. 19, 2024

(65) Prior Publication Data

US 2024/0357659 A1 Oct. 24, 2024

Related U.S. Application Data

(63) Continuation of application No. PCT/CN2021/125527, filed on Oct. 22, 2021.

(51) Int. Cl.
*H04W 74/0833* (2024.01)

(52) U.S. Cl.
CPC ............................... *H04W 74/0833* (2013.01)

(58) Field of Classification Search
CPC ................................................ H04W 74/0833
See application file for complete search history.

(56) References Cited

U.S. PATENT DOCUMENTS

2020/0146069 A1* 5/2020 Chen ................. H04W 74/0833
2021/0176678 A1 6/2021 Isokangas et al.
2021/0227585 A1* 7/2021 Tsai .................... H04W 74/006
2022/0046510 A1* 2/2022 Kung ................. H04B 7/06964
2024/0008077 A1* 1/2024 Han .................. H04W 74/0816

FOREIGN PATENT DOCUMENTS

CN 111757527 A 10/2020
CN 112913319 A 6/2021
WO WO-2021/047778 A1 3/2021

OTHER PUBLICATIONS

Examination Search Report Appl. No. 3235990 on CA dated Jul. 22, 2025 (5 pages).
International Search Report and Written Opinion for PCT Appl. No. PCT/CN2021/125527 mailed Jul. 28, 2022 (with English translation, 9 pages).
Itri, "Discussion on how the dedicated RACH resources should be prioritized"; 3GPP TSG RAN WG2 #99bis, R2-1711766, Oct. 9-13, 2017; Prague, Czech Republic, (3 pages).
Extended European Search Report for EP App. No. 21961025.0 dated Dec. 17, 2024 (10 pages).

* cited by examiner

*Primary Examiner* — Brian J. Gillis
(74) *Attorney, Agent, or Firm* — Foley & Lardner LLP

(57) ABSTRACT

Presented are systems and methods for enhanced random access procedure. A wireless communication device may receive a configuration indicating whether a common Random Access Channel (RACH) resource is allowed for use from a wireless communication node. The wireless communication device can determine, based on the configuration, whether to use the common RACH resource after a failed random access procedure using a specific RACH resource.

20 Claims, 8 Drawing Sheets

SYSTEMS AND METHODS FOR ENHANCED RANDOM ACCESS PROCEDURE

CROSS-REFERENCE TO RELATED APPLICATION

This application claims the benefit of priority under 35 U.S.C. § 120 as a continuation of International Patent Application No. PCT/CN2021/125527, filed on Oct. 22, 2021, the disclosure of which is incorporated herein by reference in its entirety.

TECHNICAL FIELD

The disclosure relates generally to wireless communications, including but not limited to systems and methods for enhanced random access procedure.

BACKGROUND

In the 5th Generation (5G) New Radio (NR) mobile networks, before a user equipment (UE) can send data to a base station (BS), the UE is required to obtain uplink synchronization and downlink synchronization with the BS. The uplink timing synchronization can be achieved by performing a random access procedure. To meet the demand for faster and efficient communications, the random access procedure is to be enhanced.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive a configuration indicating whether a common Random Access Channel (RACH) resource is allowed for use from a wireless communication node. The wireless communication device can determine, based on the configuration, whether to use the common RACH resource after a failed random access procedure using a specific RACH resource.

In some implementations, the specific RACH resource may be associated with at least one of: a slice, a service type, or a User Equipment (UE) type. In some implementations, the configuration may include a single-bit indication of system information. The configuration may include a maximum number of failed random access procedure using the specific RACH resource that is tolerable prior to switching to using the common RACH resource. The maximum number may apply to any of a plurality of slices, any of a plurality of service types, and any of a plurality of UE types that are each configured with a respective specific RACH resource.

In some implementations, the configuration can include a list of slices, service types, and UE types for which a switch from using the specific RACH resource to using the common RACH resource is allowed. The configuration may include a maximum number of failed random access procedure using the specific RACH resource that is tolerable prior to switching to using the common RACH resource. In some cases, the maximum number may apply to a respective one of the list of slices, a respective one of the list of service types, or a respective one of the list of UE types.

In some implementations, the wireless communication device can determine that the common RACH resource is not allowed for use. The wireless communication device can indicate a random access problem to a higher layer. In some implementations, the wireless communication device can determine that the common RACH resource is allowed for use. The wireless communication device can initiate another random access procedure using the common RACH resource.

At least one aspect is directed to a system, method, apparatus, or a computer-readable medium. A wireless communication node may transmit a configuration to the wireless communication device indicating whether a common Random Access Channel (RACH) resource is allowed for use. The wireless communication device can determine, based on the configuration, whether to use the common RACH resource after a failed random access procedure using a specific RACH resource.

The systems and methods presented herein include a novel approach for enhanced random access procedure. Specifically, the systems and methods presented herein discuss a novel solution for a fallback procedure from access using specific RACH resources to common RACH resources. For instance, the user equipment (UE) can receive a configuration from a network/base station/gNB side. Upon receiving the configuration, the UE can determine/decide/identify whether to use common RACH resources, such as when random access (RA) via specific RACH resources for certain slices, UE types, or service types fails. For example, the configuration may include/indicate/provide one-bit indication in system information showing/indicating whether fallback from access using specific RACH resources (or certain slices or slice groups, UE types, or service types) to access using common RACH resources are allowed (e.g., whether allowed or not allowed).

In some implementations, the configuration may include/track a maximum number of RA failures from using the specific RACH resources before fallback to using (or access using) common RACH resources can be introduced. The maximum number may be applied to any types/kinds of slices, service types, or UE types with specific RACH resources configured. In some cases, the configuration can include a list of slices, slice groups, UE types (e.g., UE with reduced capability or UE requesting message 3 (MSG3) physical uplink channel (PUSCH) repetition for coverage enhancement), and/or service types (e.g. small data transmission), for which the fallback from access using the specific RACH resources to access using the common RACH resources is allowed.

In some implementations, the configuration can include the maximum number of RA failures using the specific RACH resources before fallback to access using common RACH resources can be introduced for each slice, slice group, UE type, or service type with specific RACH resources configured. In some cases, the UE may initiate RA using the common RACH resources and/or indicate a Random Access problem to upper layers based on the configuration.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
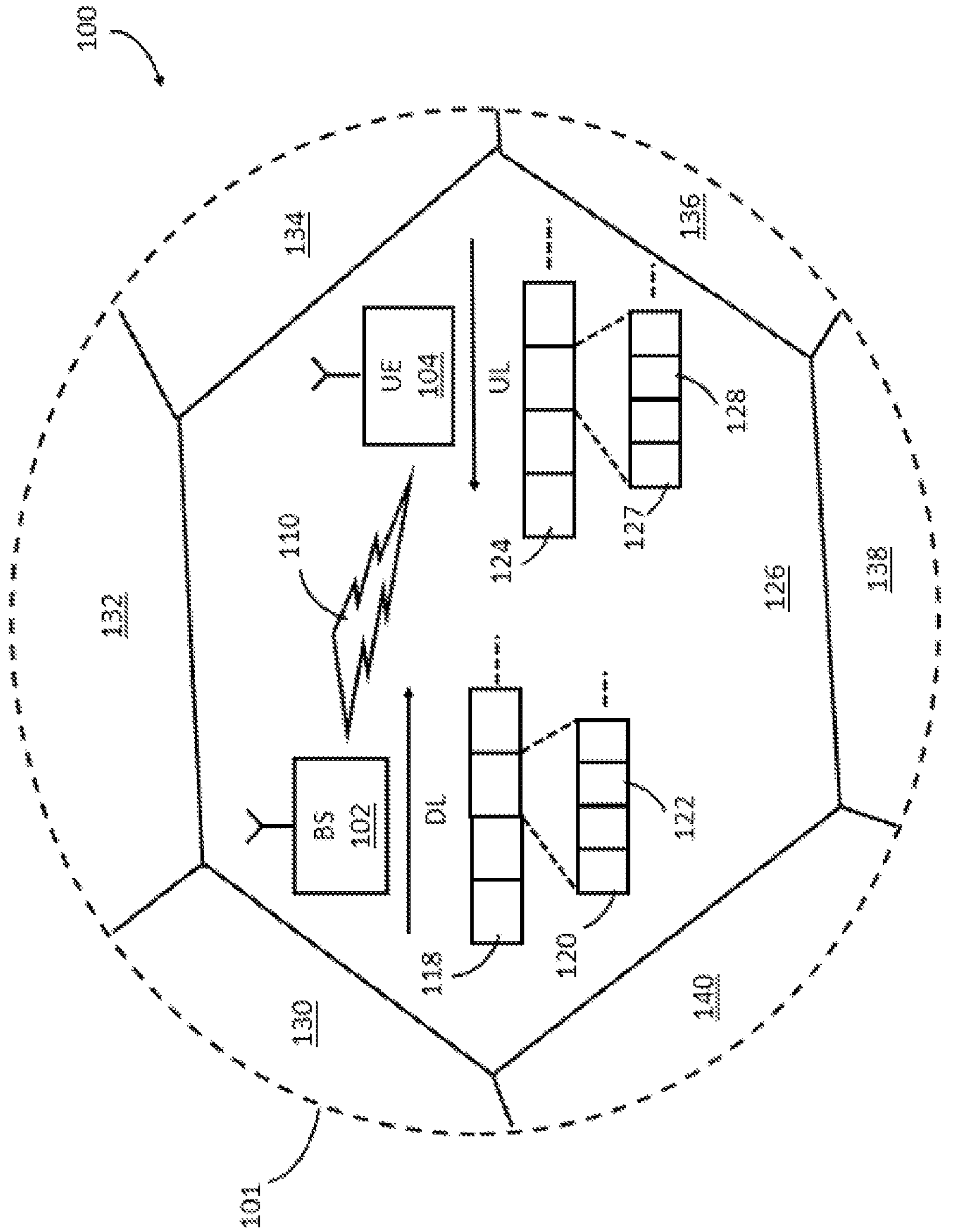
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
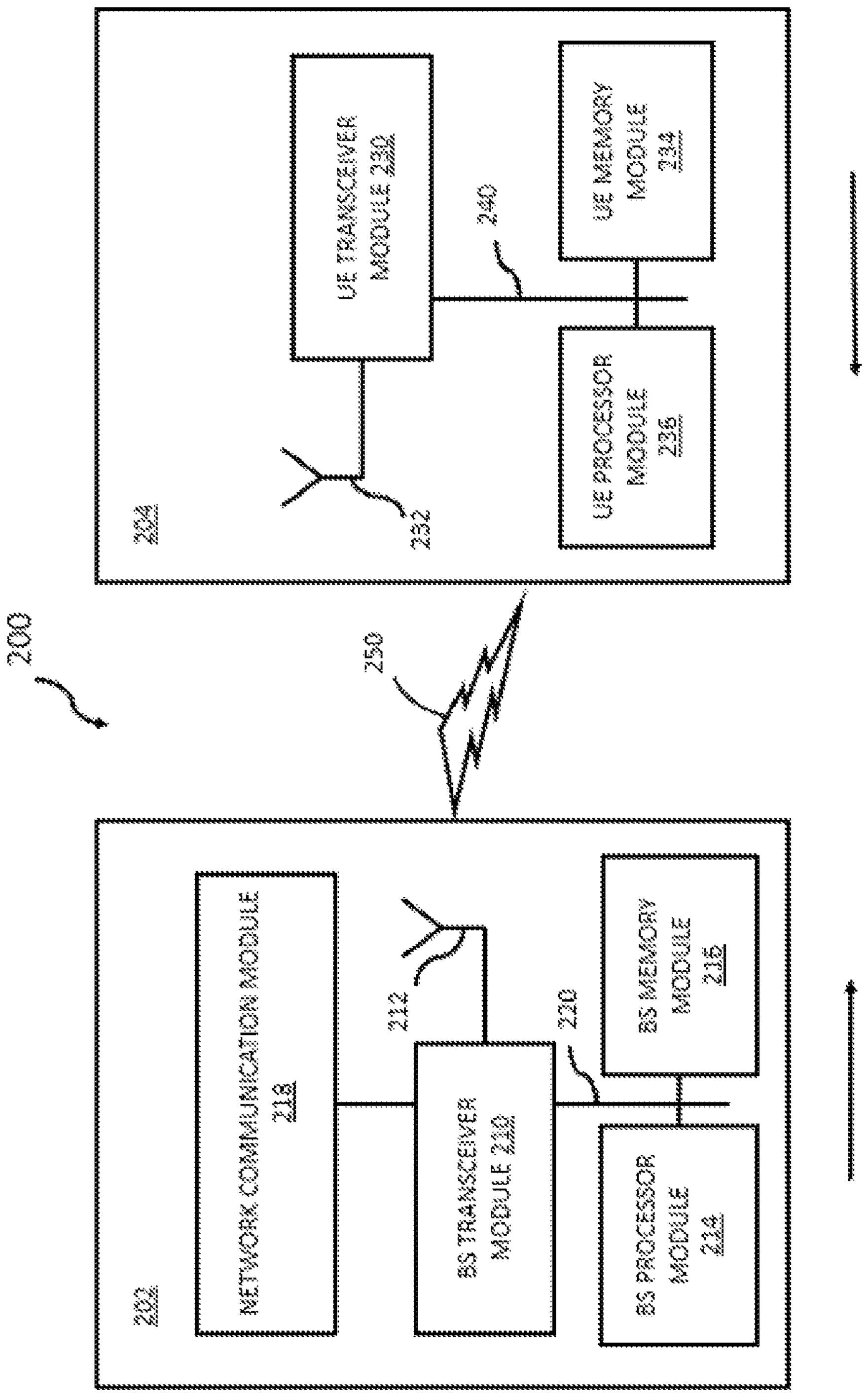
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuity that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Enhanced Random Access Procedure

In certain systems, UE can compensate timing advance (TA) on the UE-side. In this case, the network should be aware of the UE-specific TA to assist the uplink (UL) and/or downlink (DL) scheduling. Further, the UE may report the information (e.g., UE-specific TA) during the random access (RA) procedure. For example, to perform the RA procedure, specific RACH resources may be configured for certain slices, UE types, and/or service types. In this case, the access for the slices/UE types/service types may apply/use the specific RACH resources for the UE to perform at least one RA procedure. However, if the UE fails to use the specific RACH resources (e.g., access for the slices/UE types/service types fails), the NW may limit access from these slices, UE types, and/or service types, for instance, by using the common RACH resources. Accordingly, by falling back to common RACH resources, the impact on other UEs' access due to the access failure in using the specific RACH resources is reduced.

Referring generally to FIGS. 3-7, depicted are examples of contention-based random access (CBRA) and contention-free random access (CFRA) with 4-step RA procedure/type and 2-step RA type, in accordance with some implementations. In certain systems, two types of RA procedures can be supported for accessing resources (e.g., RACH resources). For example, the two types can include 4-step RA type with MSG1 (e.g., message 1 or first message) and 2-step RA type with MSGA (e.g., message A). In certain other systems, the types may not be limited to the 4-step and/or 2-step RA types.

Figure 3:
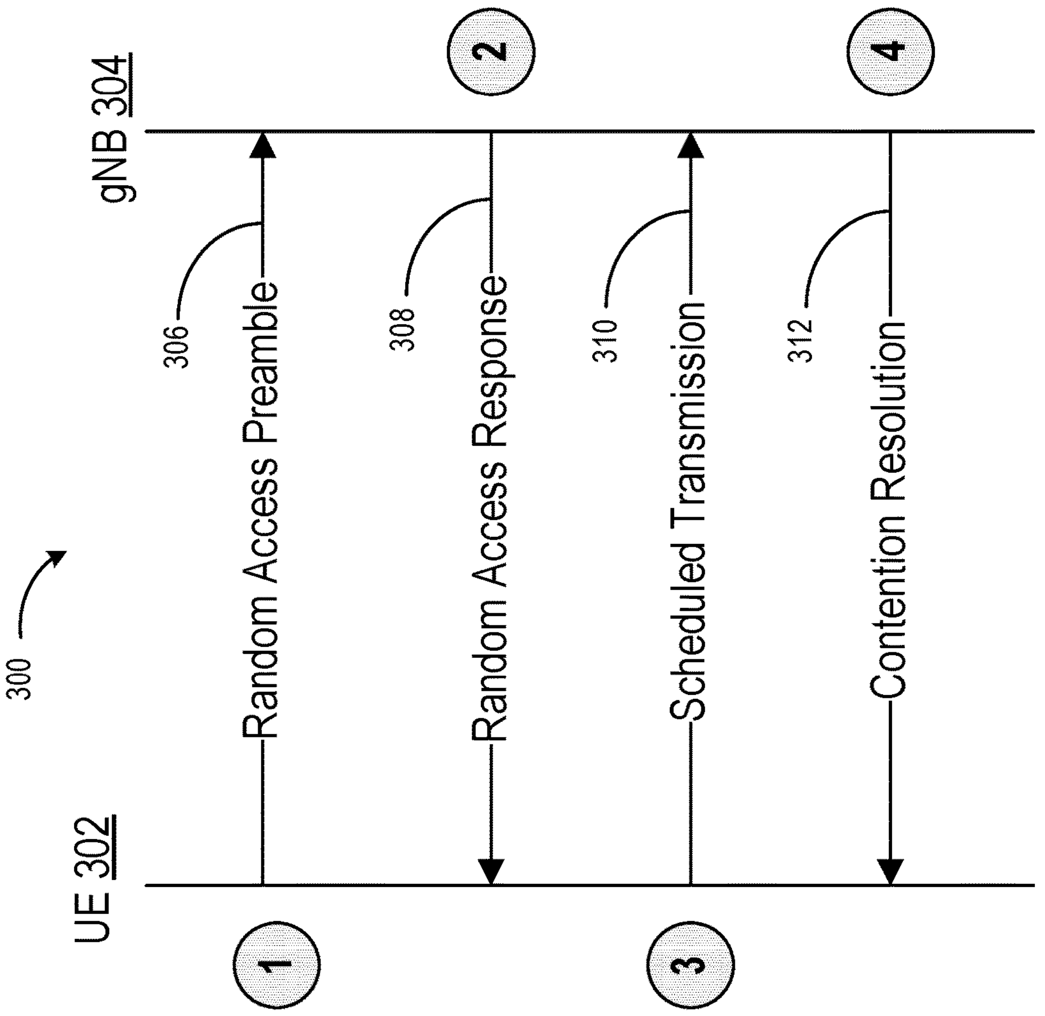
FIG. 3 illustrates an example contention-based random access (CBRA) with 4-step random access (RA) procedure/type, in accordance with some embodiments of the present disclosure.

Referring now to FIG. 3, depicted is an example contention-based random access (CBRA) with 4-step RA procedure/type, in accordance with some embodiments of the present disclosure. The CBRA with 4-step RA procedure (RACH) 300 is performed between a base station (BS) 304 (e.g., a gNB) and a UE 302. BS 304 and UE 302 may be the same or similar to BS 202 and UE 204 in FIG. 2, respectively. In some embodiments, at Step 1 (306), the UE 302 transmits a random access channel (RACH) preamble or physical random access channel (PRACH) preamble in message 1 (MSG1) through an uplink random access channel (RACH) to the BS 304. At Step 2 (308), once the preamble is received successfully by the BS 304, the BS 304 sends a message 2 (MSG2) back to the UE 302, in which a medium access control (MAC) random access response (RAR) can be included as a response to the preamble. MSG2 may be a response message transmitted by the BS 304 and received by the UE 302. At Step 3 (310), once the MAC RAR with a corresponding random access preamble (RAP) identifier (ID) is received, the UE 302 can transmit a message 3 (MSG3) to the BS 304 with the grant carried in the MAC RAR (e.g., using UL grant scheduled in the RA response). The UE 302 can transmit MSG3 to the BS 304 for scheduling transmission of the RA procedure. The UE 302 can monitor contention resolution. At Step 4 (312), once the MSG3 is received, the BS 304 sends a message 4 (MSG4) to the UE 302, in response to receiving MSG3 (e.g., second response message). MSG4 can include contention resolution ID can be included for the purpose of contention resolution. In some implementations, if contention resolution is not successful after MSG3 transmission(s)/retransmission(s), the UE 302 may retransmit or go back to MSG1. In some implementations, to reduce latency and accelerate the initial access procedure, a 2-step random access procedure can be used, as described in conjunction with FIG. 4 below.

Figure 4:
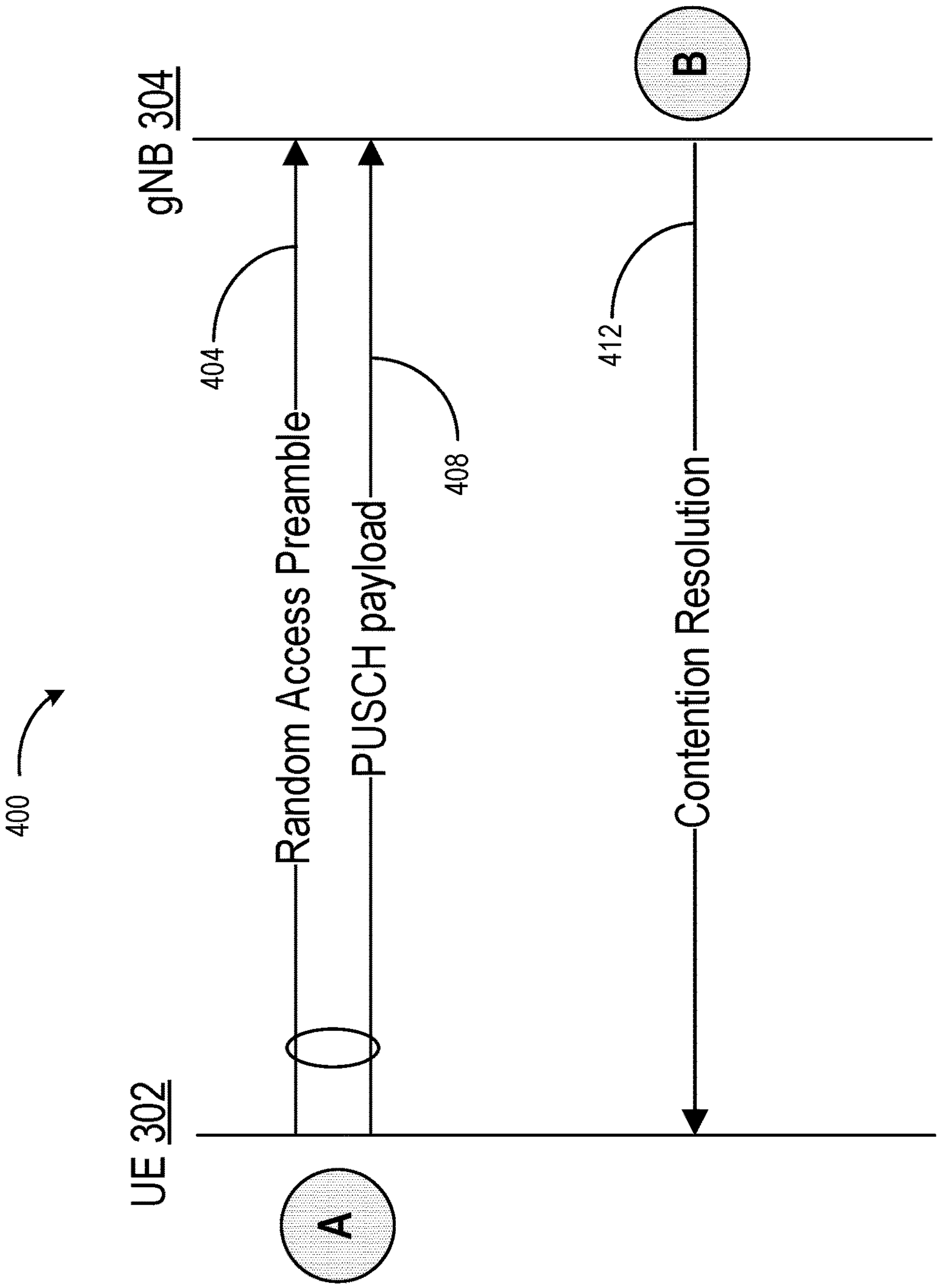
FIG. 4 illustrates an example CBRA with 2-step RA procedure, in accordance with some embodiments of the present disclosure.

FIG. 4 illustrates an example CBRA with 2-step RA procedure, in accordance with some embodiments of the present disclosure. In some implementations, a 2-step random access procedure (RACH) 400 can complete the four steps in FIG. 3 in two messages or two steps. In some implementations, at least some content of the MSG1 and MSG3 from the 4-step RACH may be included in MSG1 of the 2-step RACH, and at least some content of the MSG2 and MSG4 (RAR and contention resolution) in the 4-step RACH may be included in MSG2 of the 2-step RACH. For instance, the 2-step random access procedure 400 can be performed between a BS 304 (e.g., a gNB) and a UE 302. The BS 304 and UE 302 may be the same or similar to BS 202 and UE 204 in FIG. 2, respectively. In some implementations, the UE 302 can transmit MSGA including a preamble (e.g., RA preamble) (404) and a data payload (e.g., physical uplink channel (PUSCH) payload) (408) to a BS 304 for access to the BS 304. In some implementations, the payload may be optional. In some implementations, the preamble may be optional. In response to receiving MSGA, the BS 304 can transmit MSGB to the UE 302 (412). The MSGB can be a response message to MSGA or contention resolution for the UE 302 (e.g., the UE 302 monitoring for contention resolution). If contention resolution is successful upon receiving the response (e.g., network response), the UE 302 can end the random access procedure as shown in FIG. 1(*b*). Details of the 2-step RA procedure may be described in further detail herein.

Figure 5:
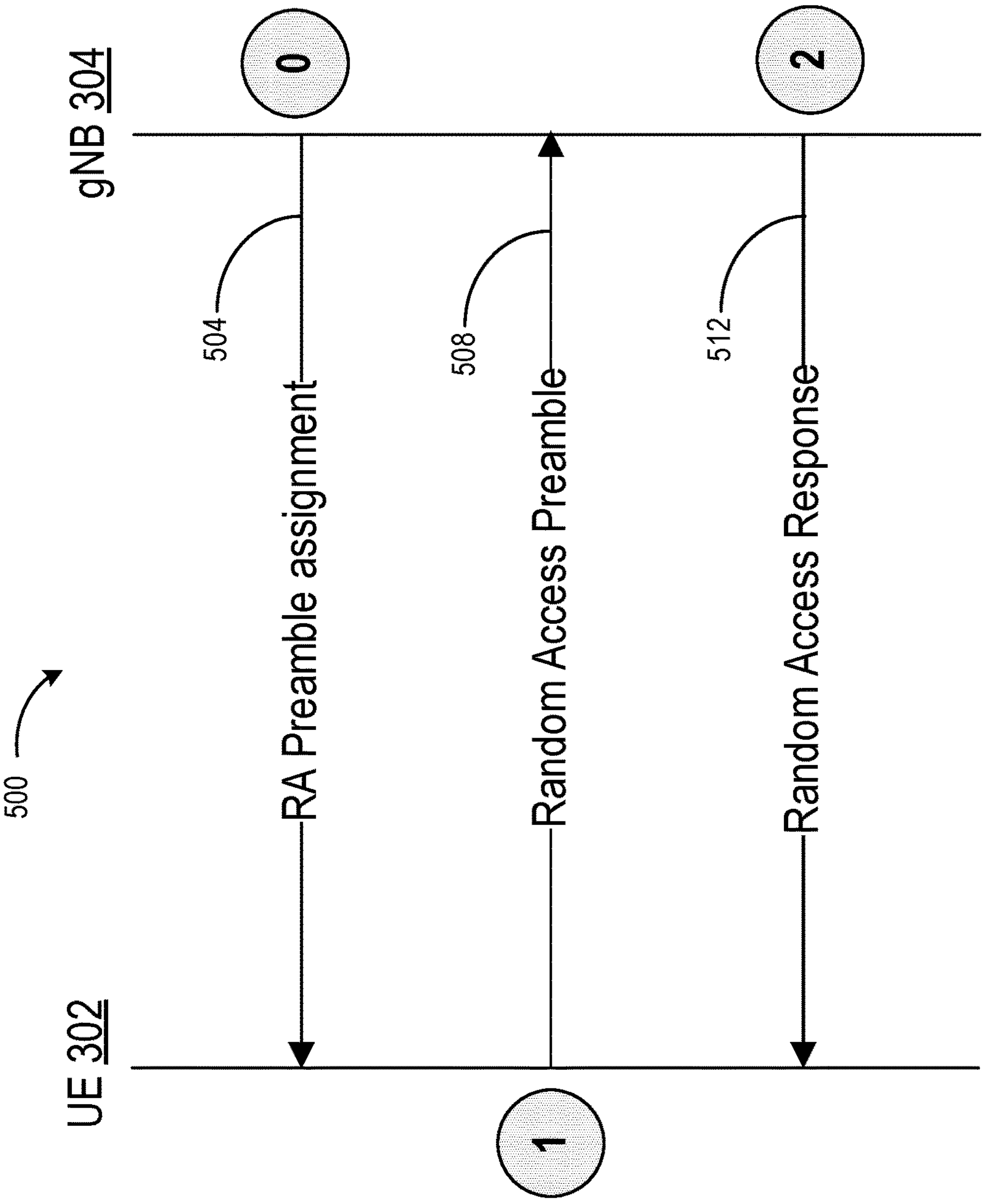
FIG. 5 illustrates an example contention-free random access (CFRA) with 4-step RA procedure, in accordance with some embodiments of the present disclosure.
Figure 6:
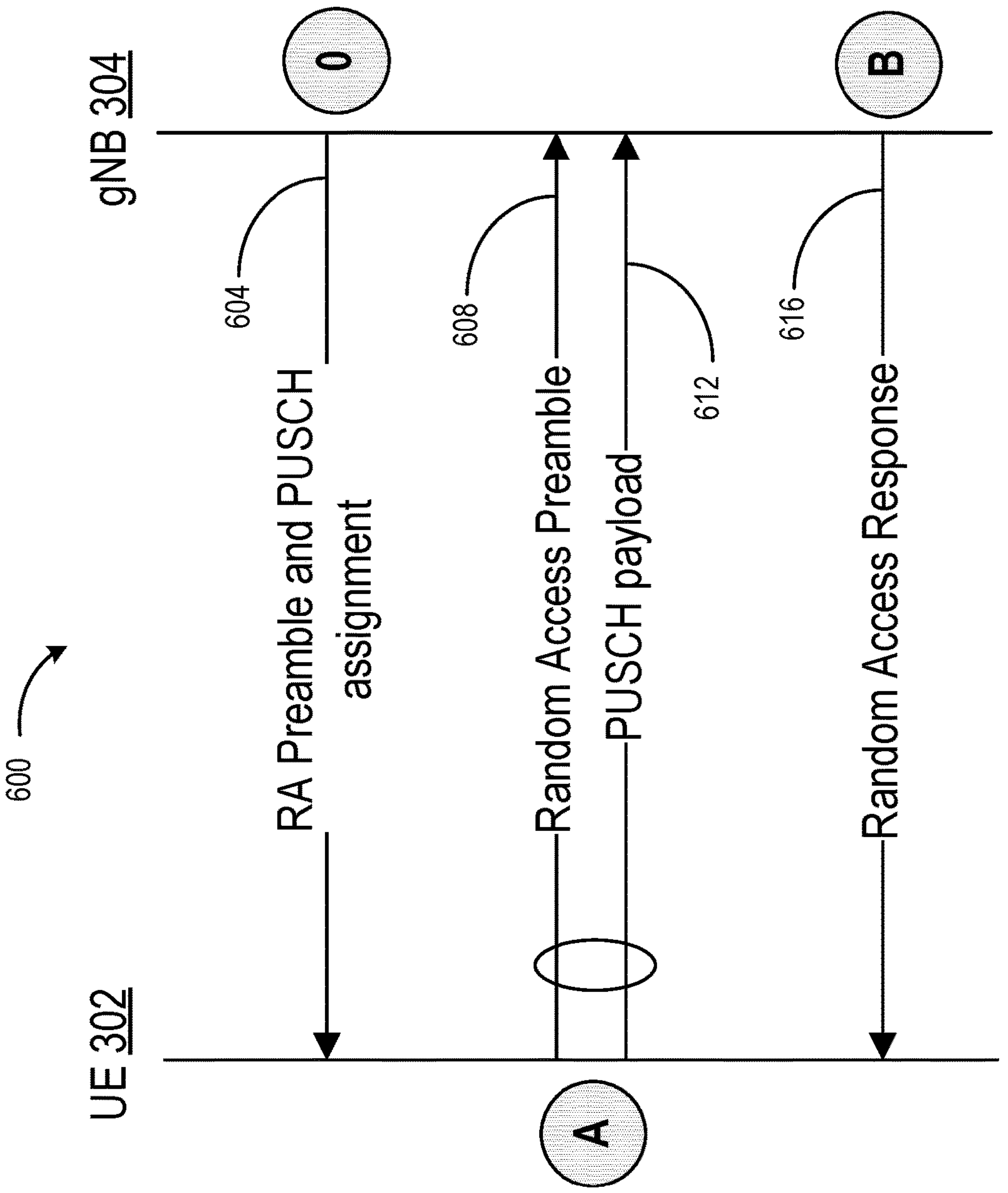
FIG. 6 illustrates an example CFRA with 2-step RA procedure, in accordance with some embodiments of the present disclosure.

FIG. 5 illustrates an example contention-free random access (CFRA) with 4-step RA procedure (500), in accordance with some embodiments of the present disclosure. The one or more messages (e.g., MSG0, MSG1, MSG2, etc.) may include information in addition to, corresponding to, or as part of one or more messages in conjunction with at least FIG. 3. At step 504, the BS 304 (e.g., gNB or NW) can transmit an RA preamble assignment (e.g., dedicated preamble) to the UE 302 as part of MSG0. The UE 302 can be allocated/assigned/provided with a portion of the resources from the BS 304 to transmit one or more subsequent messages to the BS 304. In response to receiving MSG0, the UE 302 can transmit MSG1 including the RA preamble to the BS 304 (508). Upon receiving MSG1, the BS 304 can transmit a response message or random access response to the UE 302 (512). In some implementations, the UE 302 can end the RA procedure in response to receiving the RA response from the BS 304. In some implementations, FIG. 6 illustrates an example CFRA with 2-step RA procedure (600), in accordance with some embodiments of the present disclosure. The one or more messages (e.g., MSG0, MSGA, MSGB, etc.) may include information in addition to, corresponding to, or as part of one or more messages in conjunction with at least FIGS. 4-5. The BS 304 can send/transmit/provide RA preamble and PUSCH assignment to the UE 302 as part of MSG0 (604). The UE 302 can receive MSG0 indicating that at least a portion of resources has been allocated or assigned to the UE 302. MSG0 can indicate the dedicated preamble for MSG1 transmission assigned by the BS 304/NW. In response to receiving MSG0, the UE 302 can transmit MSGA including at least RA preamble (608) and PUSCH payload (612) to the BS 304. In some cases, the UE 302 may not transmit the RA preamble. In some other cases, the UE 302 may not transmit the PUSCH payload. In response to receiving MSGA, the BS 304 can transmit RA response to the UE 302 (616). In some implementations, the UE 302 can end the RA procedure upon receiving the RA response.

Figure 7:
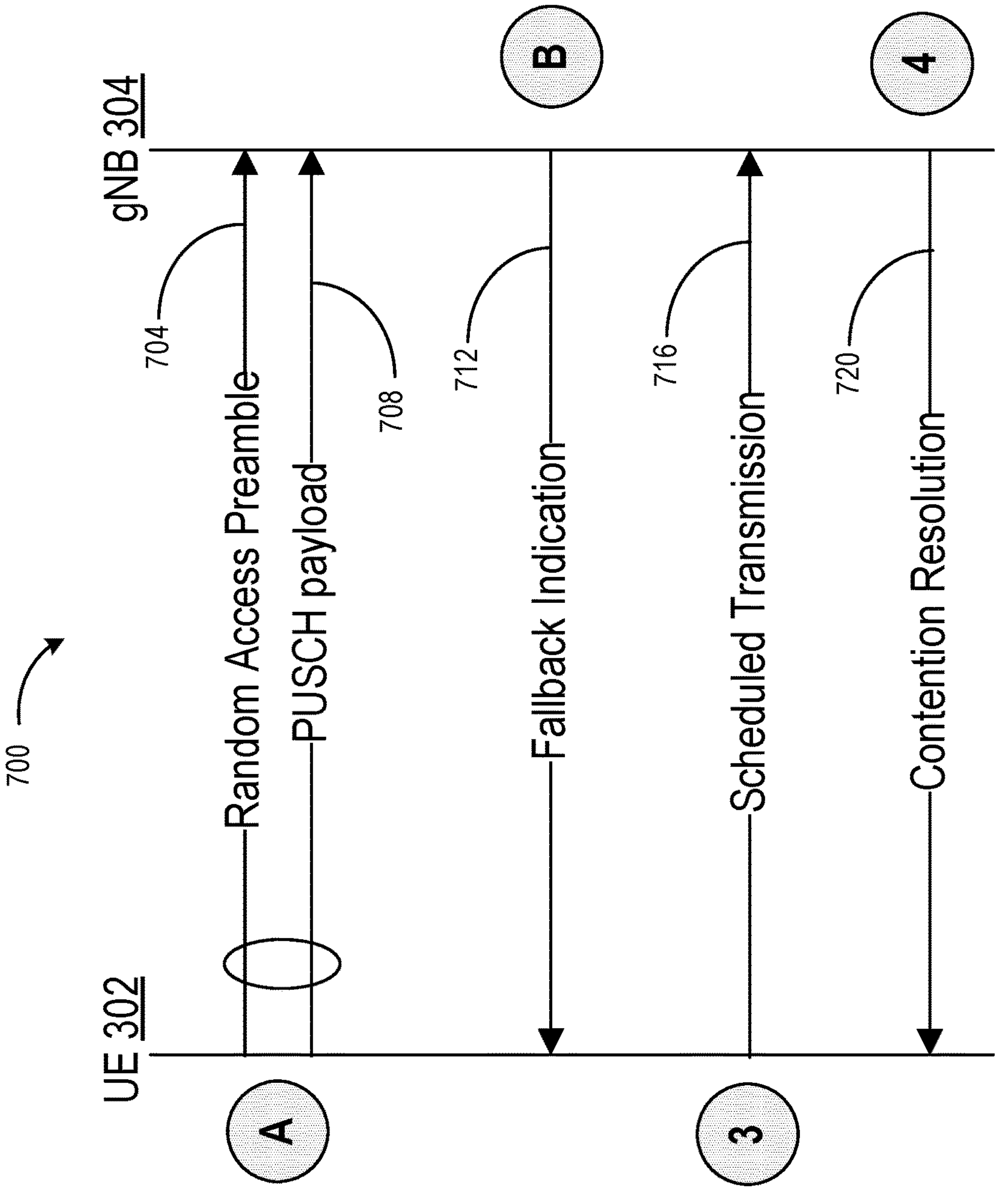
FIG. 7 illustrates an example fallback for CBRA with 2-step RA procedure, in accordance with some embodiments of the present disclosure.

FIG. 7 illustrates an example fallback for CBRA with 2-step RA procedure (700), in accordance with some embodiments of the present disclosure. The fallback for CBRA with 2-step RA procedure 700 may be performed between the UE 302 and the BS 304. The messages (e.g., MSGA, MSGB, MSG3, MSG4, etc.) transmitted between the UE 302 can the BS 304 can include, correspond to, or be a part of the messages as discussed in conjunction with at least FIGS. 3-4. The UE 302 can transmit the RA preamble (704) and PUSCH payload (708) as part of MSGA to the BS 304. In some cases, the BS 304 can transmit a fallback indication to the UE 302 as part of MSGB (712). If the fallback indication is received in MSGB, the UE 302 may perform MSG3 transmission using the UL grant scheduled in the fallback indication (716). The UE 302 can monitor for contention resolution from the BS 304. In response to receiving MSG3, the BS 304 can transmit the contention resolution (720) to the UE 302. If contention resolution is not successful after transmitting/retransmitting the MSG3, the UE 302 may revert back to MSGA transmission or perform at least one of steps 704 or 708. For example, in some cases, the UE 302 may not transmit the payload. In some other cases, the UE 302 may not transmit RA preamble.

In some implementations, in a non-terrestrial network (NTN), the UE 302 with location information can compensate the timing advance based on at least the location of the UE 302 and the evaluated transmission delay between UE 302 and the satellite, among other components or devices introducing the transmission delay. In certain systems, the BS 304 (e.g., gNB or network) may not be aware of the compensated value at the UE side. Therefore, the BS 304 may not be able to schedule UE 302 efficiently. Hence, the UE 302 can report at least the location information and the evaluated transmission delay to the BS 304 to enhance the efficiency of UE scheduling.

In some implementations, the BS 304 can reserve specific RACH resources for certain slices, UE types, or service types (e.g., small data transmission) for individual UEs 302. Other common RACH resources may be open to all UEs 302. Due to the limited RACH resources, the BS 304 or network may experience congestion, which may result in a failure of access for the slices, UE types, or service types. In this case, the UE 302 may attempt/try to use the common RACH resources during access failures. To avoid impact on the RACH resources usages for UEs 302 already using common RACH resources (e.g., using common RACH resources by default), the BS 304 may limit access (e.g., from other UEs 302) in using common RACH resources from those certain slices, UE types, or services assigned with specific RACH resources. For instance, the BS 304 can open/provide/allow access/allocate the common RACH resources to any UEs 302 when there is no congestion or access overload from the UEs 302 already using the common RACH resources.

The UE 302 can execute/perform/initiate one or more features, functionalities, or operations to address failures of access using specific RACH resources. For example, the UE 302 can receive a configuration (e.g., configuration file/message, instruction, indication) from the BS 304/NW-side. The UE 302 can use the configuration to determine whether to use the common RACH resources if RA via specific RACH resources for certain slices, UE types, or service types fails (e.g., access failure).

Example Implementation for a Configuration

Various options/parameters/alternatives can be considered for implementing the configuration for transmission from the BS 304 to the UE 302. The configuration may be a file, message, data, or signal communicated/transmitted between the BS 304 and the UE 302. For example, as a first option (e.g., option 1), the configuration can include one-bit indication in system information. The one-bit indication can provide/show/indicate whether fallback from access using specific RACH resources (or certain slices, slice groups, UE types, or service types) to access using common RACH resources is allowed (or not allowed). The one-bit indication can include, for example, binary 0 or 1 indicating whether the fallback to the common RACH resources is allowed. In some implementations, if the one-bit indication is 1, fallback may be allowed. Otherwise, if the one-bit indication is 0, fallback may not be allowed. In certain cases, the one-bit indication of 0 and 1 may indicate allowing fallback and not allowing fallback procedure/action/operation, respectively.

In further example, in option 1, the configuration may include a maximum (max) number of RA failures using the specific RACH resources. The max number may be a counter/tracker/incrementer for keeping track of RA failures when using the specific RACH resources. The max number of RA failures using the specific RACH resources can indicate or correspond to a threshold for when a fallback to access using common RACH resources can be introduced/allowed during/in response to RA failure using the specific RACH resource. The max number can be applied to any kinds/types of slices, service types, or UE types with specific RACH resources configured.

In some implementations, a second option (e.g., option 2) can be considered for the configuration. For example, the configuration can indicate for which slice, UE type, or service type a fallback from access using specific RACH resources to access using common RACH resources is allowed or not allowed. For instance, the configuration can include a list of one or more slices, slice groups, UE types (e.g., UE with reduced capability or UE requesting MSG3 PUSCH repetition for coverage enhancement), or service types (e.g., small data transmission) which the fallback (e.g., fallback procedure) from access using the specific RACH resources to access using the common RACH resources can be allowed. In this case, if the slices/slice groups/UE types/service types are not on the list, the configuration can indicate that fallback for the respective slices/slice groups/UE types/service types not included in the list may not be allowed.

In some cases, as part of option 2, the configuration can indicate a max number of RA failures using the specific RACH resources before fallback to access using common RACH resources can be introduced for each slice, slice group, UE type, and/or service type. For example, the configuration can provide a threshold for indicating a limit of the number of times RA failures are allowed to occur without the fallback procedure. Accordingly, upon exceeding the threshold (e.g., reaching the max number of RA failures), the fallback procedure can be introduced. Upon introducing the fallback procedure, an access failure using the specific RACH resource can be transferred/change to access using common RACH resources. The configuration may provide other configurations or parameters for determining whether the fallback procedure is allowed or to introduce the fallback procedure.

Example Implementation for Determining Whether to Use Common RACH Resources Upon RA Failure Upon determining whether to use the common RACH resources if access using specific RACH resources (or certain slices/slice groups/UE types/service types) fails, the UE 302 can initiate/re-initiate RA using one of the specific-RACH resources or common RACH resources according to/based on the configuration. In some implementations, the UE 302 can receive/obtain a one-bit indication from the configuration. The one-bit indication can broadcast/indicate to the UE 302 whether the fallback procedure (e.g., from access using specific RACH resources or certain slices/slice groups/UE types/service types to access using common RACH resources is allowed.

For example, in the one-bit indication configuration, if 1) access using specific RACH resources fails, 2) a preamble transmission counter is calculated as PREAMBLE_TRANSMISSION_COUNTER=preamble TransMax+1, and 3) the BS 304 indicates that fallback from access using specific RACH resources to access using common RACH resources is not allowed, the UE 302 may indicate an RA problem/issue/error to upper layers, e.g., the RRC layer. In another example, if 1) access using specific RACH resources fails, 2) the PREAMBLE_TRANSMISSION_COUNTER=preambleTransMax+1, and 3) the BS 304 indicates that fallback from access using specific RACH resources to access using common RACH resources is allowed, the UE 302 may initiate an RA procedure using the common RACH resources (e.g., instead of initiating/re-initiating RA procedure using the specific-RACH resources).

In some implementations, the configuration can include a list of one or more slices/slice groups/UE types/service types that are allowed fallback from access using the specific RACH resources to access using the common RACH resources. For example, if 1) access using specific RACH resources for a slice/slice group/UE type/service type fails, 2) the PREAMBLE_TRANSMISSION_COUNTER=preambleTransMax+1, and 3) BS 304 (or NW) indicates that fallback to access using the common RACH resources is not allowed, the UE may indicate an RA problem to the upper layers. In another example, if 1) access using specific RACH resources for a slice/slice group/UE type/service type fails, 2) the PREAMBLE_TRANSMISSION_COUNTER=preambleTransMax+1, and 3) the BS 304 indicates that fallback to access using the common RACH resources is allowed, the UE 302 may initiate/execute/perform the RA procedure using the common RACH resources.

In some cases, the configuration can include or be assigned with a max number. For example, if 1) a max number of RA failures using the specific RACH resources is configured for a slice/slice group/UE type/service type, 2) the number of RA failures using the specific RACH resource for the respective slice/slice group/UE type/service type (e.g., slice that is assigned the max number) has reached the max number, and 3) the BS 304 indicates that fallback to access using the common RACH resources is allowed for the respective slice/slice group/UE type/service type, the UE 302 can initiate RA procedure using the common RACH resources.

In another example, if 1) a max number of RA failures using the specific RACH resources is configured for a slice/slice group/UE type/service type, 2) the number of RA failures using the specific RACH resource for the respective slice/slice group/UE type/service type reached the max number, and 3) the BS 304 indicates that fallback to access using the common RACH resources is not allowed for the respective slice/slice group/UE type/service type, the UE 302 can indicate a problem/error with the RA to the upper layers. Accordingly, the UE 302 can consider the aforementioned configuration or data/information of the configuration to determine whether to initiate a fallback procedure (e.g., access using common RACH resource upon failure of access using specific RACH resource). Hence, the UE 302 may access the slice/service using the common RACH resource upon one or more failures of RA using the specific RACH resource, thereby enabling access and mitigating impact on other existing UEs 302 usign common RACH resource.

Figure 8:
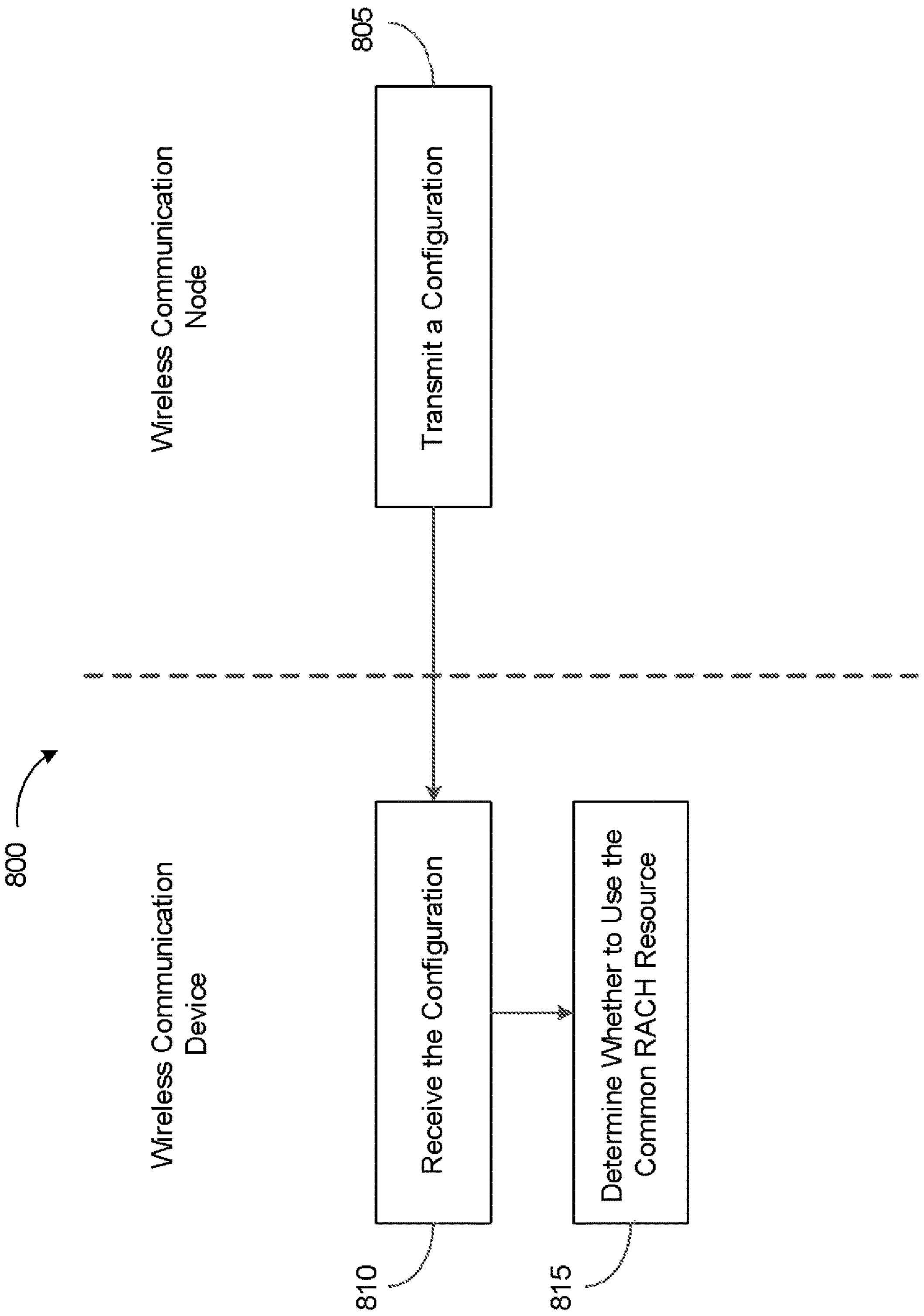
FIG. 8 illustrates a flow diagram of an example method for enhanced random access procedure, in accordance with an embodiment of the present disclosure.

Referring to FIG. 8, a flow diagram of an example method 800 for enhanced random access procedure is shown, in accordance with an embodiment of the present disclosure. The method 800 may be implemented using any of the components and devices detailed herein in conjunction with at least FIGS. 1-7. In overview, the method 800 may include transmitting a configuration (805). The method 800 can include receiving the configuration (810). The method 800 can include determining whether to use a common RACH resource (815).

Referring now to operation (805), and in some implementations, a wireless communication node (e.g., gNB, BS, or NW) may send/transmit/forward/provide a configuration to the wireless communication device (e.g., UE or client device). In response to the transmission, the wireless communication device can receive the configuration from the wireless communication node (810). The configuration can indicate/provide/notify whether a common RACH resource is allowed for use. For instance, the configuration can indicate that the UE 302 can use a common RACH resource as part of a fallback procedure in response to RA failures using a specific RACH resource.

Referring to operation (815), and in further example, the wireless communication device can determine/identify, based on the configuration, whether to use the common RACH resource after a failed RA procedure using a specific RACH resource. The wireless communication device can initiate/perform the determination in response to or prior to the RA failure. The specific RACH resource may include, be a part of, or be associated with at least one of a slice, a service type, or a UE type.

In some implementations, the configuration may include a single-bit (e.g., one-bit) indication of system information. For example, the single-bit indication of the configuration can indicate whether the fallback procedure or change from access using specific RACH resource to the common RACH resource is allowed. In some cases, the configuration can include a maximum number (e.g., threshold/limit) of failed RA procedures using the specific RACH resource that is tolerable/allowed/acceptable prior to switching to using the common RACH resource. In some cases, the maximum number can be preconfigured by an administrator/operator, for example, of the wireless communication node. In this case, impact on one or more wireless communication devices already/currently using the common RACH resource can be minimized.

In further example, the maximum number may be applied to any of the slices, any of the service types, and/or any of the UE types that are each configured with a respective specific RACH resource. For example, a max number (e.g., 5, 8, 10, etc.) can be applied to the respective slice/service type/UE type with specific RACH resources configured. The wireless communication device may access any slice for any service. In response to the wireless communication device experiencing/incurring/impacted by RA procedure (e.g., access) failure using specific RACH resources exceeding/beyond the max number, the wireless communication device can switch to use the common RACH resources.

In some implementations, the configuration may include a list of slices, service types, and/or UE types for which a switch from using the specific RACH resource to using the common RACH resource is allowed. The wireless communication device can switch from using the specific RACH resource to using the common RACH resource in response to one or more RA procedure failures using the specific RACH resource. In this case, the slices, service types, and/or UE types not included in the list may not be allowed to switch from using the specific RACH resource to using the common RACH resource.

In some cases, with the list included in the configuration, the configuration may include a maximum number of failed RA procedures using the specific RACH resource that is tolerable prior to switching to using the common RACH resource. The maximum number may be applied to a respective one of the list of slices (e.g., one of the slice), a respective one of the list of service types, and/or a respective one of the list of UE types. For instance, the wireless communication node can configure a first max number for a first slice, a second max number for a second slice, a third max number for a certain service type (e.g., small data transmission), etc. In this case, the wireless communication device accessing the first slice can switch to using the common RACH resource in response to RA procedure failures using the specific RACH resource exceeding the first max number. In another example, the wireless communication device accessing the second slice can switch to using the common RACH resource in response to RA procedure failures using the specific RACH resource exceeding the second max number, and so forth.

In some other implementations, the configuration may be modified, such that slices, service types, and/or UE types included in the list are not allowed to switch between/from using the specific RACH resource to using the common RACH resource. In this case, the slices, service types, and/or UE types not included in the list can be switched from using the specific RACH resource to using the common RACH resource in response to one or more failures of RA procedure using the specific RACH resource.

In some implementations, the wireless communication device can determine that the common RACH resource is not allowed for use based on the configuration. In this case, the wireless communication device can indicate an RA problem/error/failure/issue to one or more higher layers. The wireless communication device can provide the indication in response to one or more RA procedure failures using the specific RACH resource. In some implementations, the wireless communication device can determine, based on the configuration, that the common RACH resource is allowed for use, such as in response to one or more RA procedure failures using the specific RACH resource. In this case, the wireless communication device may initiate another RA procedure using the common RACH resource.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A wireless communication method, comprising:

receiving, by a wireless communication device from a wireless communication node, a configuration indicating whether a common Random Access Channel (RACH) resource is allowed for use; and determining, by the wireless communication device, based on the configuration, whether to use the common RACH resource after a failed random access procedure using a specific RACH resource.

2. The wireless communication method of claim 1, wherein the specific RACH resource is associated with at least one of: a slice, a service type, or a User Equipment (UE) type.

3. The wireless communication method of claim 1, wherein the configuration includes a single-bit indication of system information.

4. The wireless communication method of claim 2, wherein the configuration further includes a maximum number of failed random access procedures using the specific RACH resource that is tolerable prior to switching to using the common RACH resource.

5. The wireless communication method of claim 4, wherein the maximum number applies to any of a plurality of slices, any of a plurality of service types, and any of a plurality of UE types that are each configured with a respective specific RACH resource.

6. The wireless communication method of claim 1, wherein the configuration includes a list of slices, service types, and UE types for which a switch from using the specific RACH resource to using the common RACH resource is allowed.

7. The wireless communication method of claim 6, wherein the configuration further includes a maximum number of failed random access procedures using the specific RACH resource that is tolerable prior to switching to using the common RACH resource.

8. The wireless communication method of claim 7, wherein the maximum number applies to a respective one of the list of slices, a respective one of the list of service types, or a respective one of the list of UE types.

9. The wireless communication method of claim 1, further comprising:

determining, by the wireless communication device, that the common RACH resource is not allowed for use; and indicating, by the wireless communication device, a random access problem to a higher layer.

10. The wireless communication method of claim 1, further comprising:

determining, by the wireless communication device, that the common RACH resource is allowed for use; and initiating, by the wireless communication device, another random access procedure using the common RACH resource.

11. A wireless communication method, comprising:

transmitting, by a wireless communication node to a wireless communication device, a configuration indicating whether a common Random Access Channel (RACH) resource is allowed for use and causing the wireless communication device to determine, based on the configuration, whether to use the common RACH resource after a failed random access procedure using a specific RACH resource.

12. A wireless communication node, comprising: at least one processor configured to:

transmit, via a transmitter to a wireless communication device, a configuration indicating whether a common Random Access Channel (RACH) resource is allowed for use; and cause the wireless communication device to determine, based on the configuration, whether to use the common RACH resource after a failed random access procedure using a specific RACH resource.

13. A wireless communication device, comprising:

at least one processor configured to:

receive, via a receiver from a wireless communication node, a configuration indicating whether a common Random Access Channel (RACH) resource is allowed for use; and determine, based on the configuration, whether to use the common RACH resource after a failed random access procedure using a specific RACH resource.

14. The wireless communication device of claim 13, wherein the specific RACH resource is associated with at least one of: a slice, a service type, or a User Equipment (UE) type.

15. The wireless communication device of claim 13, wherein the configuration includes a single-bit indication of system information.

16. The wireless communication device of claim 14, wherein the configuration further includes a maximum number of failed random access procedures using the specific RACH resource that is tolerable prior to switching to using the common RACH resource.

17. The wireless communication device of claim 16, wherein the maximum number applies to any of a plurality of slices, any of a plurality of service types, and any of a plurality of UE types that are each configured with a respective specific RACH resource.

18. The wireless communication device of claim 13, wherein the configuration includes a list of slices, service types, and UE types for which a switch from using the specific RACH resource to using the common RACH resource is allowed.

19. The wireless communication device of claim 18, wherein the configuration further includes a maximum number of failed random access procedures using the specific RACH resource that is tolerable prior to switching to using the common RACH resource.

20. The wireless communication device of claim 19, wherein the maximum number applies to a respective one of the list of slices, a respective one of the list of service types, or a respective one of the list of UE types.

* * * * *